United States Patent [19]

Sugishima

[11] Patent Number: 4,628,395
[45] Date of Patent: Dec. 9, 1986

[54] OVERLOAD PROTECTING CIRCUIT FOR AN INVERTER DEVICE

[75] Inventor: Eiichi Sugishima, Nagoya, Japan

[73] Assignee: Mitsubishi Denki Kabushiki Kaisha, Tokyo, Japan

[21] Appl. No.: 673,988

[22] Filed: Nov. 21, 1984

[30] Foreign Application Priority Data

Nov. 21, 1983 [JP] Japan ................. 58-219003
Jan. 13, 1984 [JP] Japan ................. 59-4431

[51] Int. Cl.[4] .............................. H02H 3/26
[52] U.S. Cl. ........................ 361/18; 318/806
[58] Field of Search ............ 361/18, 76, 77, 33, 361/87, 100; 318/798, 802, 806; 323/910; 363/37, 126, 129, 142

[56] References Cited

U.S. PATENT DOCUMENTS 3,716,718  2/1973 Nowell ................. 361/76
3,881,147  5/1975 Ueda et al. ............ 193/3
3,930,193 12/1975 Kornrumpf et al. ..... 363/37
3,999,087 12/1976 Compton .............. 361/76
4,060,841 11/1977 Allen ................... 361/33
4,084,205  4/1978 Bohnert ................ 361/77
4,545,464 10/1985 Nomura ................ 318/802

FOREIGN PATENT DOCUMENTS 2002943  8/1970 Fed. Rep. of Germany .
2451940  5/1975 Fed. Rep. of Germany .
2523365 12/1975 Fed. Rep. of Germany .
2023317  6/1976 Fed. Rep. of Germany .
2624784 12/1976 Fed. Rep. of Germany .
2643896  3/1978 Fed. Rep. of Germany .
3312288 11/1983 Fed. Rep. of Germany .
 154060 12/1979 Japan ................. 323/910

Primary Examiner—A. D. Pellinen
Assistant Examiner—A. Jonathan Wysocki
Attorney, Agent, or Firm—Oblon, Fisher, Spivak, McClelland & Maier

[57] ABSTRACT

The inverter device for performing a.c.-d.c.-a.c. conversion has a power discrimination circuit for discriminating whether a power source is of a single phase or three phases. As a result of discrimination, a suitable overload protecting circuit provided in the device is selected or a reference level for overcurrent is changed to thereby protect structural elements such as a converter, a smoothing capacitor etc. from breakage caused by overcurrent.

3 Claims, 6 Drawing Figures

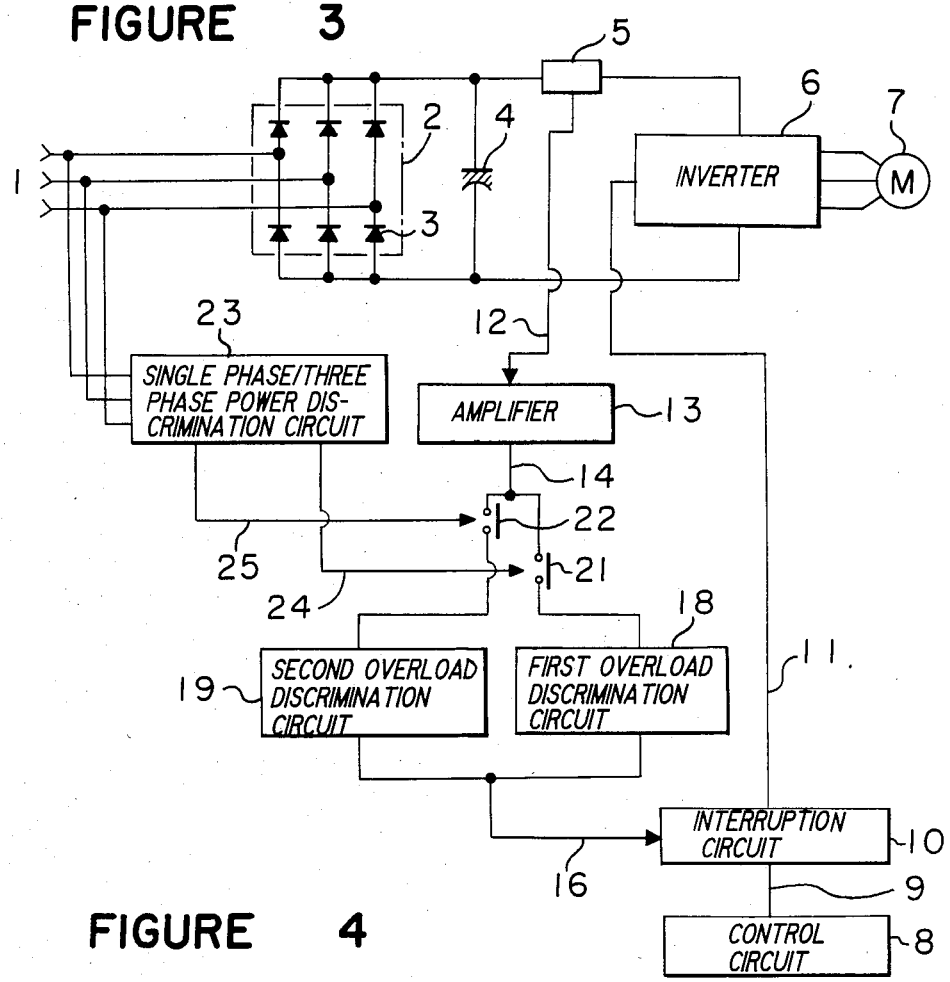
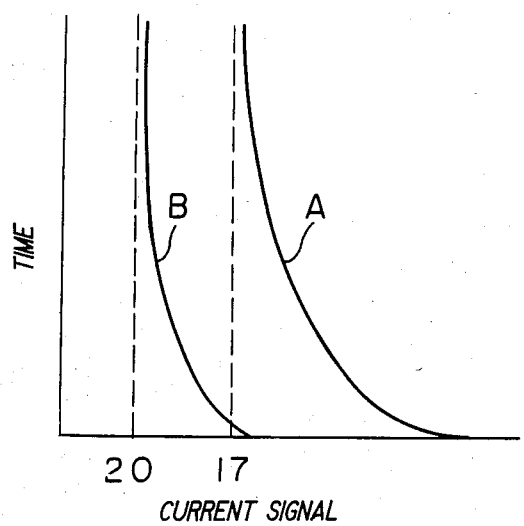

OVERLOAD PROTECTING CIRCUIT FOR AN INVERTER DEVICE

BACKGROUND OF THE INVENTION

1. Field of the Invention

The present invention relates to an inverter device for driving alternating current loads such as a.c. motors. More particularly, it relates to an improvement in an overload protecting circuit for an inverter device.

2. Discussion of the Background

FIG. 1 shows a conventional inverter device in which a reference numeral 1 designates an a.c. power source connected to a converter 2 constituted by rectifying elements 3; a numeral 4 designates a capacitor connected on one hand to the converter 2 and connected on the other hand to an inverter 6 through a current detector 5; a numeral 7 designates an a.c. motor connected to the inverter 6; a numeral 8 designates a control circuit for outputting a first gate signal 9 to an interruption circuit 10; a numeral 11 designates a second gate signal as an output of the interruption circuit 10 fed to the inverter 6; a numeral 12 designates a current-detection signal as an output of the current detector 5 to be input into an amplifier 13; a numeral 14 designates a current as an output of the amplifier 13 to be input into an overload discrimination circuit 15 as an overload protecting means; and a numeral 16 designates an overload-interruption signal as an output of the overload discrimination circuit 15 to be input into the interruption circuit 10.

The operation of the conventional overload protecting circuit will be described.

The converter 2 rectifies an alternating current from the a.c. power source 1 by the rectifying elements 3 to form a direct current. The direct current resulted by the converter 2 is smoothed by the capacitor 4 and the smoothed direct current is fed to the inverter 6, in which electric valves connected the arms of the inverter 6 are sequentially turned on and off by a signal which has been subjected to pulse width modulation by the second gate signal 11. Thus, the inverter supplys an a.c. power having a variable frequency and a variable voltage to the a.c. motor as an alternating current load to drive it at a variable speed.

The control circuit 8 outputs the first gate signal 9 subjected to pulse width modulation. When the interruption circuit 10 is driven under normal condition, namely, when no overload-interruption signal 16 is output, the first gate signal 9 is output from the circuit 10 as the second gate signal 11 as it is (the magnitude of the input signal and the output signal is same.). However, when the overload-interruption signal 16 is output, the second gate signal 11 produces a signal for turning off the electric valves of the inverter 6 irrespective of the first gate signal to break supply of power to a load. In this case, the current detector 5 detects current fed to the inverter 6 and input a detection signal 12 having the magnitude corresponding to the detected current to the amplifier 13. The amplifier 13 amplifys the current detection signal 12 and inputs the amplified signal to the overload discrimination circuit 15 as a current signal 14. The overload discrimination circuit 15 possesses inverse time-current characteristic as shown in FIG. 2. Namely, the overcurrent interruption signal 16 is not output when a current flowing in the inverter is less than a first rated current 17 which is the rated value of the inverter. However, when an overload condition such that a current exceeding the first rated current 17 flows for a predetermined time period is maintained, the overload-interruption signal 16 is output to the interruption circuit 10 to protect elements and devices such as the converter 2, the capacitor 4, the inverter 6, the a.c. motor 7, after lapse of time corresponding to intensity of the current. When the overload-interruption signal 16 is output, the interruption circuit 10 outputs to the inverter 6 a signal for turning off the electric valves of the same whereby the inverter 6 is stopped to supply electric power to the load.

In the overload protecting circuit of the conventional inverter device having the construction described above, when the converter 2 and the smoothing capacitor 4 are designed in consideration of the first rated current 17 on the basis of use of three phase alternating power as the power source 1, if a single phase alternating power is used as the power source 1, an excessively increased current flows in the converter 2 and the smoothing capacitor 4 because of change in phase from three phases to a single phase and the increased current exceeds a designed value. Accordingly, it is necessary for the rated current to be smaller than the first rated current for the three phase alternating power and the converter 2 and the smoothing capacitor 4 have to be used at a current region lower than a second rated current for a single phase alternating power so that current flowing in these devices is maintained within a designed value. However, it is difficult to protect the converter 2 and the smoothing capacitor 4 from breakage caused by overload at the time of feeding the single phase power since the overload protecting circuit 15 has inverse time protective characteristic which is determined on the basis of the first rated current for the three phase alternating power.

SUMMARY OF THE INVENTION

It is an object of the present invention to eliminate the disadvantage of the conventional overload protecting circuit for an inverter device and to provide an inverter device which has applicability and high reliability and protects a converter and a smoothing capacitor from overload even when the inverter device having the converter and the smoothing capacitor designed for three phase alternating power is operated with a single phase alternating power by constructing the inverter device in such a manner that an overload protecting means is selectively used or a reference level for overcurrent is changed as a result of discriminating whether a power source is of a single phase or three phases.

The foregoing and the other objects of the present invention have been attained by providing a current protecting circuit for an inverter device which converts an alternating current from an a.c. power source into a direct current by a converter, the direct current resulted by the converter being smoothed by a smoothing capacitor, the smoothed direct current being subjected to inverse conversion by an inverter to be an alternating current which is used for driving an alternating current load, characterized in that a single phase/three phase power discrimination means for discriminating whether an input power is of an alternating current or a direct current is provided to stop the inverter device when overcurrent is resulted in the inverter, as a result of discrimination by the single phase/three phase power discrimination means.

BRIEF DESCRIPTION OF THE DRAWINGS

FIG. 3 is a circuit diagram of an embodiment of the inverter device according to the present invention;

FIG. 4 is a characteristic curve for overload protection of an embodiment of the inverter device of the present invention;

DESCRIPTION OF THE PREFERRED EMBODIMENTS

Figure 1:
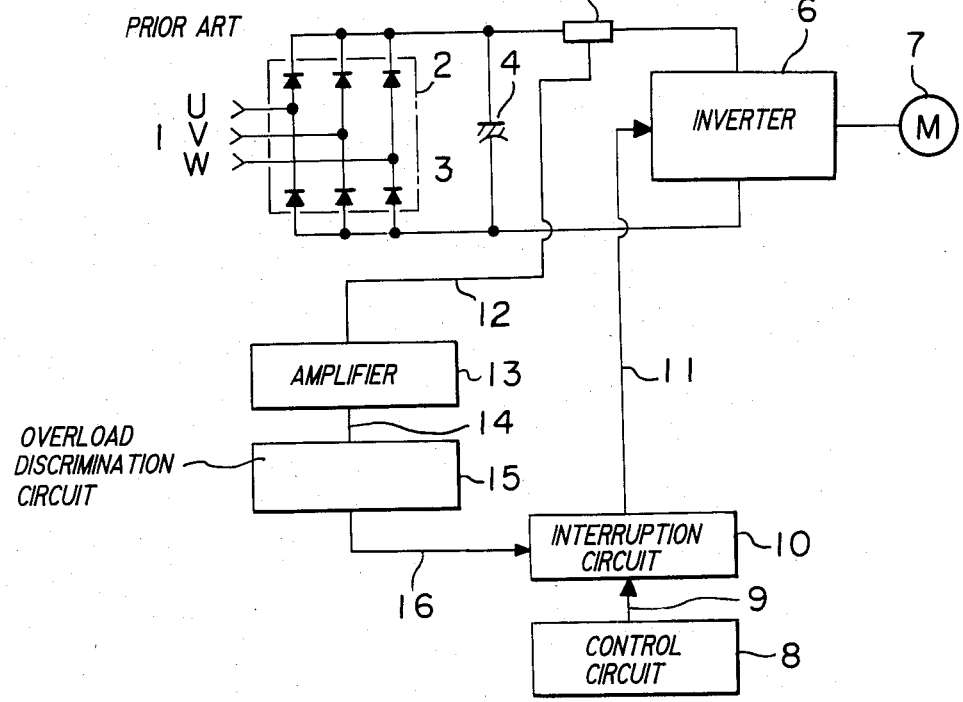
FIG. 1 is a circuit diagram of the conventional inverter device.
Figure 2:
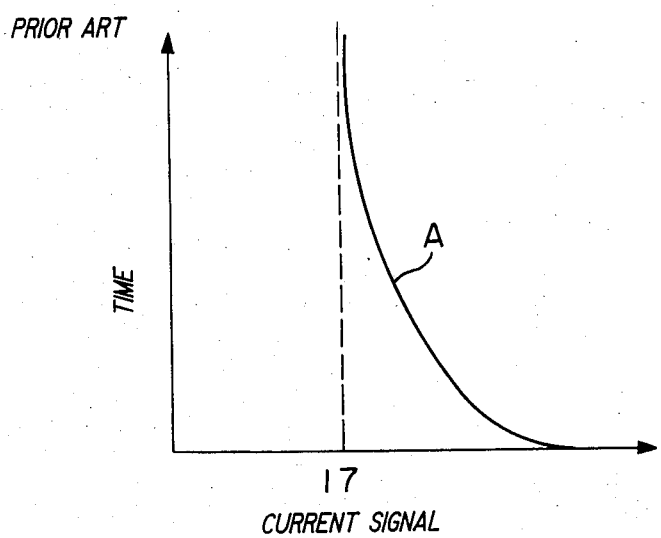
FIG. 2 is a characteristic curve for overload protection of the conventional inverter device.

An embodiment of the present invention will be described with reference to FIGS. 3 to 5.

In FIG. 3, a reference numeral 18 designates a first overload discrimination circuit as an overload protecting means for three phase power which has inverse-time characteristic determined on the base of the first rated current 17 for three phase power as shown by the character A in FIG. 4. Namely, the discrimination circuit 18 does not produce an overload-interruption signal 16 when a current flowing in the inverter device is lower than the rated current 17 in the case of supply of three phase power. However, an overload condition wherein a current having the intensity higher than the rated current continues to flow for a predetermined time period, is caused, it outputs an overload-interruption current 16 to the interruption circuit 10 after lapse of time corresponding to the intensity of the current to protect the converter 2, the capacitor 4 the inverter 6, the a.c. motor 7, etc.

A reference numeral 19 designates a second overload discrimination circuit as an overload protecting means for a single phase power and has inverse time characteristic which is determined on the basis of a second rated current 20 for a single phase power as shown in the character B in FIG. 4. Namely, the discrimination circuit 19, which is provided for protection of the converter 2, the capacitor 4 and so on, does not output the overload-interruption signal 16 when a current flowing in the inverter device is lower than the rated current 20 in the case of supply of a single phase power; however, when an overload condition wherein a current exceeding the rated current 20 continues to flow for a predetermined time period, is maintained, it outputs the overload-interruption current 16 to the interruption circuit 10 after lapse of time corresponding to the intensity of the current.

The first and second overload discrimination circuits 18, 19 which function as an overcurrent level changing means may be of a well known circuit and accordingly, the detailed description of the circuits is omitted.

A reference numeral 21 designates a first contact interposed in the circuit between the amplifier 13 and the first overload discrimination circuit 18; a numeral 22 designates a second contact interposed in the circuit between the amplifier 13 and the second overload discrimination circuit 19; a numeral 23 designates a single phase/three phase power discrimiantion circuit as means for descriminating whether the a.c. power source 1 is of a single phase or three phases, which outputs a three phase signal 24 by rendering the first contact 21 to be in a closed state when three phase power is supplied and outputs a single phase signal 25 by rendering the second contact 22 to be a closed state when a single phase power is supplied.

Figure 5:
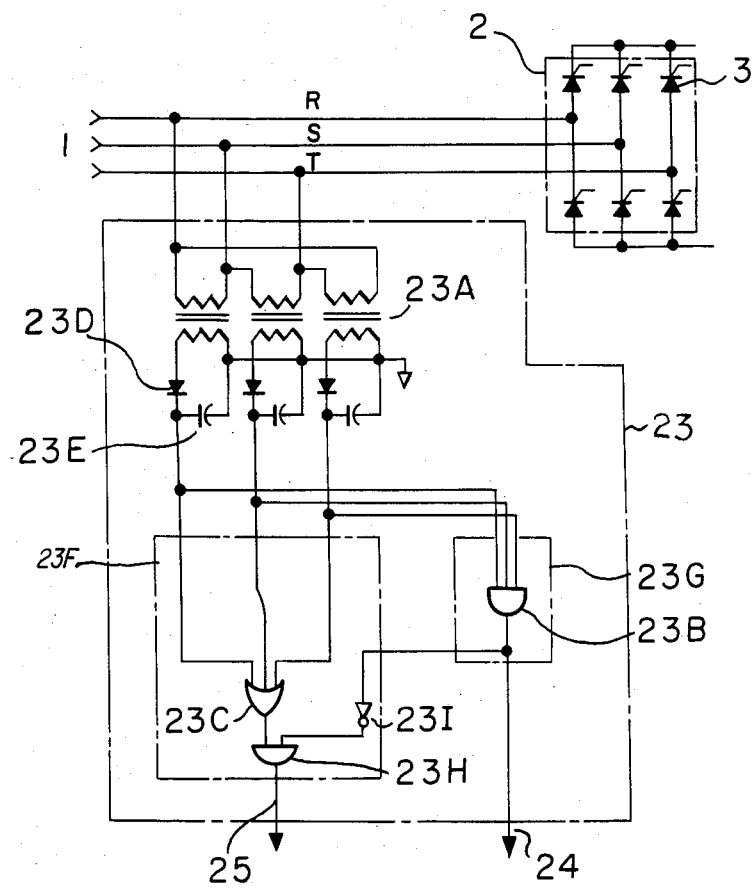
FIG. 5 is a circuit diagram of an embodiment of a single phase/three phase power discrimination circuit used for the inverter device according to the present invention.

The single phase/three phase power discrimination circuit 23 is constructed as shown in FIG. 5.

In FIG. 5, an insulating transformer 23A for insulating line voltage detects a voltage to reform it an operable level of voltage for a logical operation circuit i.e. an AND circuit 23B, an OR circuit 23C and so on. Rectifiers 23D and capacitors 23E connected at the output side of the insulating transformer 23A rectify and smooth the line voltage subjected to voltage drop and feed the power having the reduced line voltage to a single phase discrimination circuit 23F and a three phase discrimination cirucit 23G respectively.

The single phase discrimination circuit 23F is constituted by the OR circuit 23C, an AND circuit 23H and a NOT circuit 23I and outputs a single phase signal 25 when a line voltage appears at any of R-S, S-T and T-R, (when the power source is of a single phase).

The three phase discrimination circuit 23G is constituted by the AND circuit 23B and outputs a three phase signal 24 when a line voltage appears at all of lines R-S, S-T and T-R, (the power source is of three phases). The AND circuit 23H and the NOT circuit 23I perform so that the single phase discrimination circuit 23F does not output a single phase signal 25 when the three phase power is input. The other construction as in FIG. 5 is the same as the conventional device and the description is therefore omitted.

The operation of the embodiment shown in FIG. 5 will be described.

The converter 2 rectifies an alternating current fed from the power source 1 by the rectifiers 3 to be in a direct current form. The capacitor 4 smoothes the direct current resulted by the converter 2 and the smoothed current is supplied to the inverter 6. The inverter 6 receives a signal subjected to pulse width modulation by the second gate signal 11 to sequentially turn on and off electric valves connected to the arms of the inverter whereby an alternating current power having a variable frequency and a variable voltage is supplied to the a.c. motor 7 as an alternating current load to drive it at a variable speed. The control circuit 8 outputs the first gate signal 9 subjected to the pulse width modulation. The interruption circuit 10 receives the first gate signal 9 and passes this signal to an output to produce the second gate signal 11 which is exactly the same as the first gate signal 9. Namely, in this case, the magnitude of the input power is the same as the output power. However, when the overload-interruption signal 16 is output, the second gate signal 11 produces a signal for turning off the electric valves of the inverter 6 irrespective of the first gate signal 9 to interrupt the electric power to the load. In this case, the current detector 5 detects a current supplied to the inverter 6 and at the same time, the current-detection signal 12 having the intensity corresponding to the detected current is input to the amplifier 13. The current-detection signal 12 amplified by the amplifier 13 is output as a current signal 14.

The single phase/three phase power discrimination circuit 23 discriminates whether the input power source 1 is of a single phase or three phases and outputs a three phase signal 24 when the power source is of three phases, whereas it outputs a single phase signal 25 when a single phase. When the single phase signal 24 is output, the first contact 21 is closed so that a current signal 14 is input to the first overload discrimination circuit 18. When the single phase signal 25 is output, the second contact 22 is closed so that a current signal 14 is input to the second overload discrimination circuit 19.

When the power source 1 is of three phases, the first overload discrimination circuit 18, which has inverse time characteristic determined on the basis of the first rated current 17 for the three phase power as shown in character A in FIG. 4, does not output the overload-interruption signal 16 when a current flowing in the inverter device is smaller than the rated current 17 in the case of supply of the three phase power. However, when an overload state wherein a current exceeding the rated current 17 continues to flow for a predetermined time period, is maintained, the first overload discrimination circuit 18 is operated to output the overload interruption current 16 to the interruption-circuit 10 to protect elements such as the converter 2, the capacitor 4, the inverter 6, the a.c. motor 7 etc. after lapse of time corresponding to the intensity of the current.

When the power source 1 is of a single phase, the second overload discrimination circuit 19, which has inverse time characteristic determined on the basis of the second rated current 20 for a single phase power as shown by the character B in FIG. 4, does not output the overload-interruption signal 16 when a current flowing in the inverter device is smaller than the rated current 20 in the case of supply of a single phase power. However, when an overload state wherein a current exceeding the rated current 20 continues to flow for a predetermined time period, is maintained, the second overload discrimination circuit 19 is operated to output the overload-interruption current 16 to the interruption circuit 10 after lapse of time corresponding to intensity of the current. When the overload state is continued, the overload-interruption current 16 is output to the interruption circuit 10 by the first or the second overload discrimination circuit 18 or 19 after lapse of time corresponding to the intensity of the current. When the overload-interruption signal 16 is output, the interruption circuit 10 outputs a signal for turning off the electric valves of the inverter 6 and the inverter 6 serves to stop supply of electric power to the load.

In the embodiment described above, the PWM type inverter is used; however, it is possible to use a PAM type inverter. Further, although diodes are used as elements for the converter, any of rectifying elements may be used and a switching element such as transistor, thyristor and so on may be used for electric valves.

In the embodiment described above, the three phase power and the single phase power is automatically discriminated by the single phase/three phase power discrimination circuit. However, it is possible to input the result of discrimination by operator's manual operation.

In the foregoing, two overload discrimination circuits are provided and the circuits are switched depending on the kind of input power to perform protection for overload by changing protecting characteristic. However, the same effect can be obtained by using an overload discrimination circuit and by changing the gain of the amplifier 13 if the protecting characteristic can be changed over between a single phase and three phases.

Further, in the foregoing embodiment, although a direct current flowing in a bus bar is detected for detection of overload, any of an inverter output current, a converter input current, a capacitor current etc. can be used as far as it is usable for detection of overload.

Figure 6:
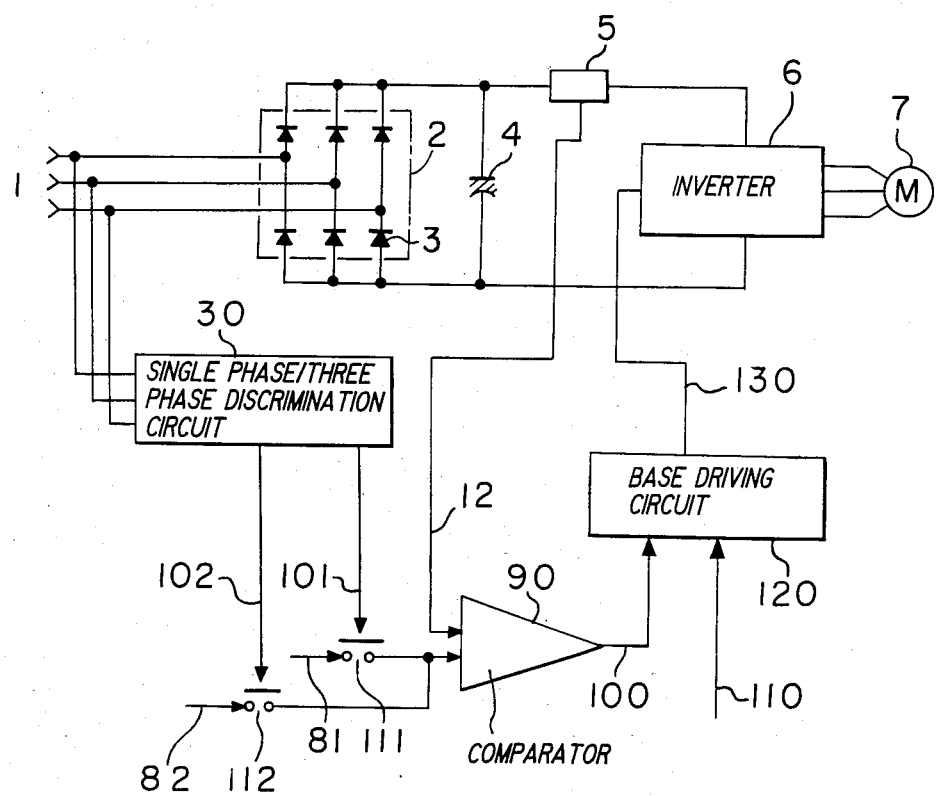
FIG. 6 is a circuit diagram of an embodiment of the overcurrent protecting circuit used for an inverter device of the present invention.

Another embodiment of the present invention will be described with reference to FIG. 6.

A single phase/three phase power discrimination circuit 30 discriminates whether an input power source for the inverter device is of single phase or three phases and outputs a single phase signal 101 when it is the single phase power source, whereas it outputs a three phase signal 102 when it is the three phase power source. A first contact 111 is closed only when the single phase signal 101 is output to thereby input an overcurrent level signal for single phase power 81 to a comparator 90. A second contact 112 is closed only when the three phase signal 102 is output to thereby input an overcurrent level signal for three phase power 82 to the comparator 90. Accordingly, the comparator 90 outputs an interruption signal 100 in the case of a current-detection signal 12 being greater than the overcurrent level signal for single phase power 81 when the single phase power is input whereby the operation of the inverter 6 is stopped. On the other hand, the comparator 90 outputs an output interruption signal 100 in the case of the current-detection signal 12 being greater than the overcurrent level signal for three phase power 82 when the three phase power is input whereby the operation of the inverter 6 is stopped.

A base drive circuit 120 receives the interruption signal 100 and a first base signal 110 and outputs a second base signal 130 to the inverter 6. During normal operation, the second base signal 130 is the same as the first base signal 110. This is supplied to the inverter 6 in order to turn on and off transistors of the inverter 6. However, supply of the second base signal 130 is prevented by the output interruption signal 100 under overcurrent condition to thereby stop the operation of transistors of the inverter 6. Accordingly, the comparator 90 functions as an overcurrent level changing means and automatically changing-over operations are performed in such a manner that when the single phase power is input, an overcurrent level for single phase power is used, while when the single phase power is input, an overcurrent level for three phase power is used.

In the foregoing embodiment, the single phase/three phase power discrimiantion circuit 30 discriminates an input power; i.e. a single phase power or a three phase power. However, another means for discriminating whether the input power is a single phase power or a three phase power may be used. For example, it is possible to input the result of discrimination in manual operations.

In the embodiment described above, the overcurrent level signal is classified into the overcurrent level signal for single phase power 81 and the overcurrent level signal for three phase power 82 depending on the kind of input power. However, any means may be used if it can change an overcurrent level. For instance, the same effect can be obtained by amplifying the current detection signal 12 by a amplifier and by changing the gain of the amplifier at the time of supply of a single phase power or a three phase power to change the overcurrent level.

In accordance with the present invention, elements of the inverter device such as a converter, a smoothing capacitor can be protected from breakage caused by overload even though the inverter device having the converter, the smoothing capacitor and so on which are designed to have a specific value on the basis of use of a three phase power, is operated by a single phase power. Thus, an inverter device having applicability and high reliability can be obtained.

What is claimed as new and desired to be secured by Letters Patent of the United States is:

1. An overcurrent protecting circuit protecting an inverter device which converts an alternating current from an a.c. power source into a direct current by a converter, the direct current resulted by said converter means smoothed by a smoothing capacitor, said smoothed direct current being subjected to inversion by an inverter to be an alternating current which is used for driving an alternating current load, including a power discrimination means for discriminating whether an input power is single phase or three phase and an overcurrent level changing means for reducing a level of overcurrent to protect said inverter from damage caused by overcurrent, said overcurrent level changing means being connected to said power discrimination means.

2. An overload protecting circuit protecting an inverter device which converts an alternating current from an a.c. power source into a direct current, the resulted direct current being subjected to inversion to be an alternating current which is used for driving an alternating load, characterized by comprising:
 (a) a power discrimination circuit for discriminating whether said power source is single phase or three phase,
 (b) an overload protecting means for three phase power which stops operation of said inverter device by using a first inverse time characteristic possessed by said overload protecting means when said power source is of three phase current, and
 (c) an overload protecting means for single phase power which has the function of overload protection at a region for a load lower than that of said overload protecting means for a three phase power and which stops operation of said inverter device by using a second inverse time characteristic possessed by said overload protecting means for a three phase power when said power source is of a single phase current, wherein as a result of discrimination of said power discrimination circuit, said overload protecting means for three phase power is operated in the case of a three phase power, whereas said overload protecting means for a single phase current is operated in the course of a single phase power.

3. An overload protecting circuit protecting an inverter device which converts an alternating current from an a.c. power source into a direct current by a converter, the direct current resulted by said converter being smoothed by a smoothing capacitor, said smoothed direct current being subjected to inversion by an inverter to be an alternating current which drives an a.c. motor, characterized by comprising:
 (a) a current detector for detecting a current fed to said inverter to produce a current detection signal,
 (b) a power discrimination means for discriminating whether said power source is single phase or three phase,
 (c) a first overload discrimination circuit which has a first inverter time characteristic determined on the basis of a first rated current and produces an overload-interruption signal when said current detection signal having an intensity greater than said first rated current continues to flow for a predetermined time period inthe case of supply of a three phase power by the operation of said power discrimination means,
 (d) a second overload discrimination circuit which has a secnd inverse time characteristic determined on the basis of a second rated current and produces an overload interruption signal when said current detection signal having an intensity greater than said second rated current continues to flow for a predetermined time period in the case of supply of a single phase power by the operation of said power discrimination means and,
 (e) an interruption circuit for producing a signal for turning-off electric valves of said inverter when said overload-interruption signal is produced, whereby supply of a power to said a.c. motor is stopped.

* * * * *